United States Patent [19]
Grimwood et al.

[11] Patent Number: 5,460,717
[45] Date of Patent: Oct. 24, 1995

[54] PARTICLE SEPARATION AND DRYING APPARATUS

[75] Inventors: Geoffrey L. Grimwood, Holmfirth; Geoffrey C. Grimwood, Upperthong, both of England

[73] Assignee: Thomas Broadbent & Sons Limited, Huddersfield, England

[21] Appl. No.: 135,790

[22] Filed: Oct. 13, 1993

[30] Foreign Application Priority Data

Oct. 20, 1992 [GB] United Kingdom ............ 9221956

[51] Int. Cl.⁶ .................. B01D 33/06; B01D 35/18
[52] U.S. Cl. .................. 210/175; 34/58; 34/132; 134/109; 210/360.1; 210/369; 210/373; 210/374; 210/375; 210/380.1; 210/391; 210/396; 210/402; 210/408; 210/416.1
[58] Field of Search .................. 210/360.1, 369, 210/372, 373, 374, 375, 380.1, 390, 391, 393, 396, 402, 408, 175, 416.1; 34/58, 132; 134/109

[56] References Cited

U.S. PATENT DOCUMENTS

| | | | |
|---|---|---|---|
| 2,953,250 | 9/1966 | Jung et al. | 210/375 |
| 3,446,431 | 9/1966 | Marchal et al. | 210/375 |
| 3,998,391 | 12/1976 | Daub | 210/375 |
| 4,000,074 | 12/1976 | Evans | 210/393 |
| 4,220,538 | 9/1980 | Zeppenfeld et al. | 210/375 |
| 4,412,865 | 11/1983 | Schmidt | 127/19 |
| 4,691,448 | 9/1987 | Alstetter et al. | 34/58 |
| 4,770,772 | 11/1983 | Kuwajima et al. | 210/184 |
| 5,183,568 | 2/1993 | Lescovich | 210/380.1 |

FOREIGN PATENT DOCUMENTS

| | | |
|---|---|---|
| 0271985 | 6/1988 | European Pat. Off. . |
| 2951666 | 7/1981 | Germany . |
| 3118251 | 11/1982 | Germany . |

*Primary Examiner*—Robert A. Dawson
*Assistant Examiner*—David Reifsnyder
*Attorney, Agent, or Firm*—Christie, Parker & Hale

[57] ABSTRACT

An apparatus which performs solids particles separation from a liquids/solids slurry, and subsequent drying of such solids particles, within a single enclosure. Further processing functions, such as reslurry washing, plug washing, crystal growth and other reactions, can also be carried out within that single enclosure. The single enclosure comprises a partly perforated centrifuge drum which can be rotated about a vertical axis at a fast speed at which the centrifugal effects on material in the drum are substantial so that partly dried solids collect in a substantially cylindrical form on the side wall of the drum, and a slow speed at which the centrifugal effects on material in the drum are negligible; a stripping mechanism which is displaceable within the drum, when the drum is rotated at slow speed, for dislodging solids which have been built up on the side wall of the drum during rotation at high speed; and means for heating at least a bottom part of the drum on which partly dried solids collect when dislodged by the stripping mechanism from the side wall of the drum. The solids can themselves thus be heated, or otherwise processed, to cause evaporation therefrom of any remaining liquid.

9 Claims, 5 Drawing Sheets

PARTICLE SEPARATION AND DRYING APPARATUS

The present invention relates to apparatus for the separation and drying of particulate particles from a slurry.

The separation of fine particulate solids from liquids, to produce totally dry solids usually requires two stages of separation. The first stage removes the bulk of the liquid by mechanical separating methods using one of several state-of-the-art separators. When this has removed as much liquid as practical, the solids plus the remaining liquid are removed from the first separator and transferred to a second vessel. Heat is applied at this second stage to the partially dried solids at the pressure needed for the process to evaporate the remaining liquid. Whilst a wide variety of combinations of equipment exist to produce dry or nearly dry solids by this means, they are all subjected to limitations, which include the following:

1. The partially dry solids must be moved from one piece of equipment and transferred to another at the end of the first stage. This has the disadvantage that (a) the process is time consuming; (b) the solids may become contaminated; (c) the technique is unacceptable with toxic solids or liquids; and (d) the process is troublesome when the separation must be made under pressure, vacuum or an inert gas blanket.

2. The maximum amount of liquid is not removed economically in the first stage. Thus, for example, if the mechanical separation is inefficient in the first stage, it leaves a larger amount of liquid to be removed by other means (evaporation, application of heat, partial vacuum, etc) all of which are time consuming and use large amounts of energy for each unit mass of liquid removed. Evaporation, heat and vacuum all require ancillary equipment and, if the liquid is to be recovered, additional condensing equipment also. The more liquid to be removed in the second stage, the larger and more costly the equipment and the energy consumed.

It is a basic object of the present invention to overcome or at least substantially mitigate the aforegoing problems associated with the known techniques.

In accordance with the present invention in its broadest aspect, there is provided an apparatus which performs solids particles separation from a liquids/solids slurry, and subsequent drying of such solids particles, within a single enclosure. Further processing functions, such as reslurry washing, plug washing, crystal growth and other reactions, can also be carried out within said single enclosure.

In accordance with a second, more specific aspect of the present invention, there is provided an apparatus for performing particle separation, drying, and one or more other process functions comprising:

(a) a partly perforated centrifuge drum adapted to be rotated about a vertical axis at a plurality of selected speeds, including a fast speed at which the centrifugal effects on material in the drum are substantial so that partly dried solids collect in a substantially cylindrical form on the side wall of the drum, and a slow speed at which the centrifugal effects on material in the drum are negligible;

(b) a stripping mechanism which is displaceable within the drum, when the drum is rotated at said slow speed, for dislodging solids which have been built up on the side wall of the drum in said substantially cylindrical form during rotation at said high speed; and (c) means for heating at least a bottom part of the drum on which partly dried solids collect when dislodged by said stripping mechanism from the side wall of the drum, whereby said solids are themselves heated, or otherwise processed, to cause evaporation therefrom of any remaining liquid.

In one embodiment, the stripping mechanism comprises a plough device which is adapted to be rotated within the drum about an axis parallel to the rotational axis of the drum whereby to enter solids which have been built up in said cylindrical form and also to be displaced longitudinally of its own rotational axis whereby to be advanced along the length of said cylindrical format. Preferably, the plough device is also displaceable laterally to enable its depth of insertion into the solids to be controlled.

Advantageously, the plough device also carries mixing elements which, when the plough device has been displaced longitudinally to approximately its fullest extent, are adapted to enter solids, which have collected on the drum bottom as a result of stripping by the plough, for stirring such solids so as to ensure maximum contact with the heated parts of the drum.

The heating means can be adapted to heat the bottom part of the drum either using a hot liquid, hot gas, steam or by electrical heating wires or by the use of electrically induced eddy currents. The heating means can also be adapted to heat the plough/mixer elements and/or supply hot air/gas to the solids via the plough/mixer elements.

Advantageously, the lower end of the drum is of conoidal shape, this lower part of the drum being free of perforations.

The bottom part of the drum can include a selectably displaceable cover which can be moved between a first, lower position, in which it covers one or a plurality of discharge holes in the drum, and a second, raised position in which it opens said one or plurality of holes to enable solids to be discharged therethrough.

An apparatus constructed in accordance with the present invention thus uses centrifugal force to reduce liquid and energy usage to a minimum and enables both separating and evaporating stages to be achieved in one enclosure (the centrifugal drum), thereby avoiding any intermediate handling of or exposure of the solids and liquids. Additional operations of solids washing, reslurrying, under vacuum, pressure and/or inert gas blanketting conditions and other reactions are also possible in the same enclosure without intermediate exposure of the solids and liquids.

The invention is described further hereinafter, by way of example only, with reference to the accompanying drawings, in which:

FIG. 1 is a diagrammatic, partially sectional view of one embodiment of a centrifugal drying apparatus incorporating the present invention and showing solids in the position adopted during high speed rotation of the dryer drum;

FIG. 2 shown the apparatus of FIG. 1 when the drum is stationary, or rotating at very low speed, and the solids have fallen to the bottom of the drum;

In the drawings, the like or equivalent parts in the various embodiments are given the same reference numbers.

Figure 1:
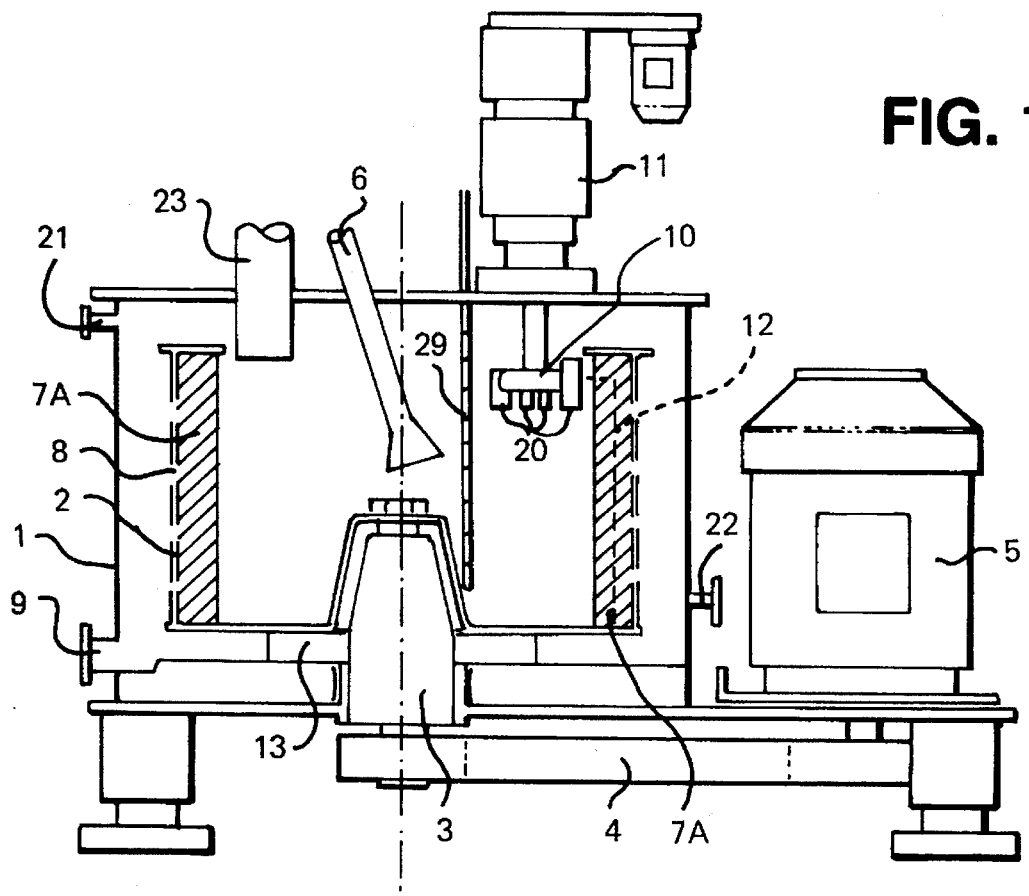

The apparatus of FIG. 1 includes an enclosure 1 containing a partly perforated drum 2 mounted on a spindle and bearing housing assembly 3 and driven by pulleys, and belts 4 and a variable speed motor 5 (or by other known means). A slurry containing the particulate solids to be dried flows through a feed pipe 6 into the drum 2 which is rotated (typically 150–750 rpm) to accelerate the slurry, causing it to flow to a near cylindrical form (as shown at 7A) against the inner surface of the drum wall 2. The small perforations 8 in the drum wall, or in a screen 27 (see FIG. 4) fitted inside the drum, retain the solids but allow liquid to flow into the enclosure 1 and thence out of a liquid outlet 9. The rotational speed of the drum and contents is then raised to a maximum (typically 750–2000 rpm) by the drive motor 5 to apply high centrifugal forces to extract the maximum amount of liquid from the solids. When the liquid flow has become negligible, the drum speed is reduced to a low value (typically 15–40 rpm) and a stripping mechanism in the form of a plough 10, having mixing blades 20, is operated by a plough mechanism 11. The operation of the plough 10 is such that it rotates and traverses from the position shown in FIG. 1 along the path 12 shown in dotted line to engage and dislodge the partly dried solids from the inner wall of the drum 2 and to direct them downwardly onto the annular bottom plate 13 of the drum 2 to complete a first drying stage.

Figure 2:
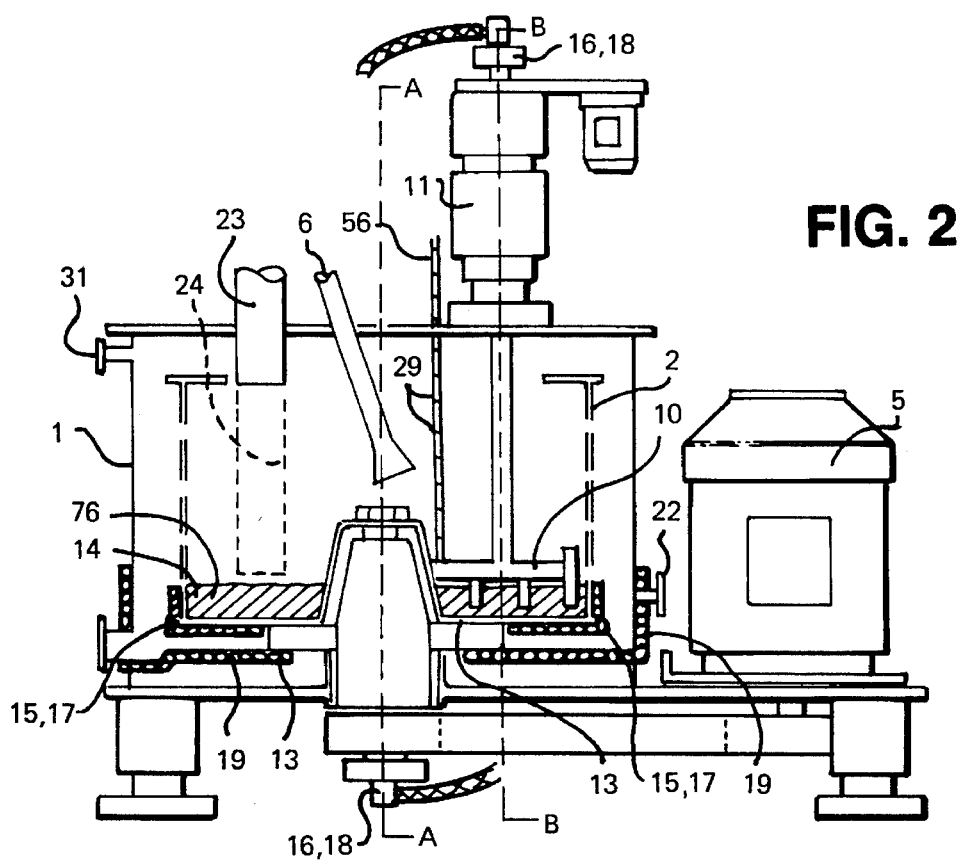

With the partly dried solids now in the position shown at 7B in FIG. 2, provision is made to heat one or more of the plough 10, the drum bottom plate 13 and a lower section 14 of the drum wall. The heating of these parts can be achieved in several different ways. For example:

(i) The use of pipes 15, fitted to the drum 2 and also fitted internally in the plough 10 and mixing blades 20 to carry steam, hot gas or hot liquid supplied to the pipes through respective rotating glands 16 mounted on the centre-lines of rotation A—A, B—B.

(ii) The fitting of high resistance heater cables 17 (typically mineral insulated) to the construction of the drum and fitted internally in the plough 10 and mixing blades 20 to carry electric currents fed to the cables through respective slip-rings 18 mounted on the centrelines of rotation (A—A, B—B).

An alternative method of heating the drum bottom plate 13 and lower section 14 of the drum wall (iii) the use of a part non-metallic enclosure 1 into which is fitted, adjacent to the parts to be heated, coils 19 of electric cable carrying variable or alternating electric currents to produce a magnetic field and induce eddy currents to flow in the drum metal parts and thus to heat them.

Figure 3:
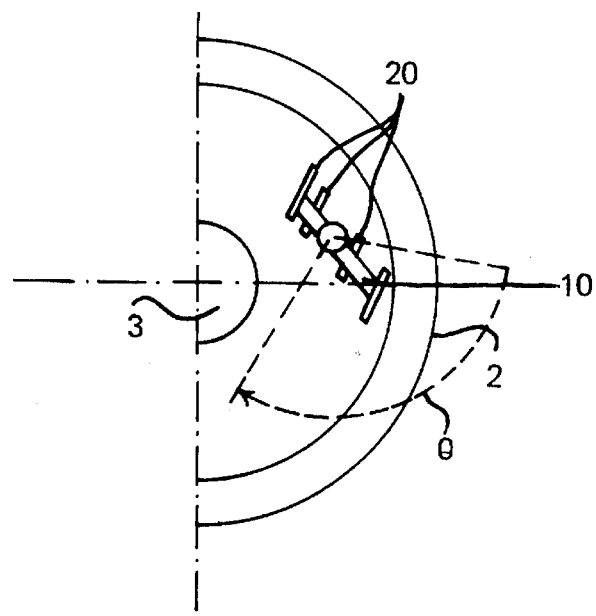
FIG. 3 illustrates the operation of a paddle pool of the apparatus of FIG. 1.

For the second stage of drying and with the drum parts and plough heated, the drum 2 is rotated slowly, either unidirectionally or in the forward and reverse directions (typically ±5 to ±50 rpm) with the plough 10 raised from its lowest position but such that the heated mixing blades 20 attached to the underside of the plough are immersed in the surface of the slowly rotating solids, as shown in FIG. 2. Whilst the drum is rotated and reversed, the plough 10 and mixing blades 20 oscillate continuously or intermittently over the arc 21Θ shown in FIG. 3 to sweep the drum bottom plate 13.

The reversing rotation of the drum and the plough and mixing blades movements are coordinated such as to stir the bed of solids in the drum to expose all solids repeatedly into contact with the heated parts and thus evaporate the liquid residue rapidly. The evaporated liquid is withdrawn as a vapour by an air or a gas flow entering the enclosure by an inlet 21 and leaving by an outlet 22.

When processing fine chemicals, pharmaceuticals and similar materials, upon completion of the second or last drying stage the fully dried solids are conveyed from the drum either pneumatically by suction or using other known means, such as a mechanical conveyor. For pneumatic conveying a suction pipe 23, positioned as shown in full line in FIG. 1 during both drying stages is mounted on the enclosure 1 with the open, lower end of the pipe inside the drum 2. The other upper end of the pipe is connected to a suction fan, vacuum pump or equivalent device (not shown). To extract the dried solids, the suction pipe 23 is lowered to the surface of the solids, as shown by dotted line 24 in FIG. 2, the drive motor rotates the drum slowly (typically 5–50 rpm), the plough and mixer blades are moved to deflect the solids to a circular path under the suction pipe and the suction fan or vacuum pump runs to extract the solids from the drum, with further downward movement of the suction pipe 23 as the solids are removed to complete the solids removal from the drum bottom plate 13. A column, cyclone or other known equipment (not shown) between the suction device and the enclosure 1 then separates the dried solids from the air/gas stream. After removal of the solids the suction pipe is withdrawn to its original (solid line) position.

Figure 4:
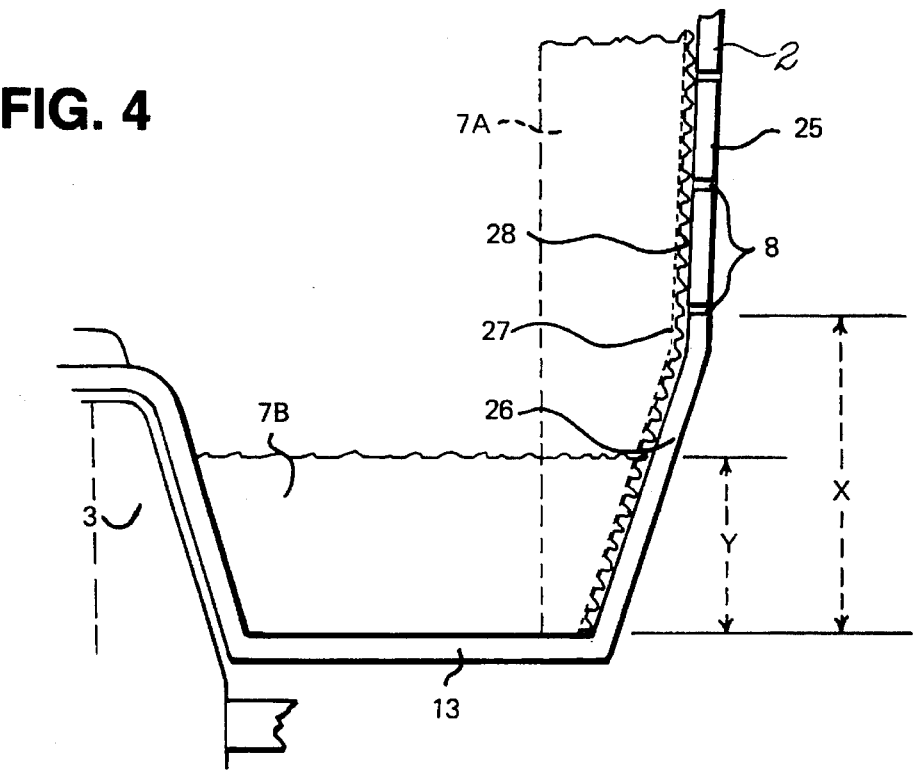
FIG. 4 is a sectional view illustrating a detail of the preferred form of drum.

FIG. 4 is a partial view showing a preferred construction for the drum 2. An upper cylindrical part 25 of the perforated drum wall is joined to the bottom drum plate 13 by an unperforated conoidal shaped section 26 of vertical dimension X (the vertical distance between the upper face of the bottom of the drum 13 and the lowest perforation opening), X being greater than the depth Y of the partly dried solids (7B) in the second drying stage. With a drum of this construction, the conoidal and cylindrical sections are lined with a finely perforated or woven screen 27 to hold back the solids, the screen being spaced from the inner walls of the drum by an open woven gauze 28 or similar material to allow the easy passage of the liquid between this perforated screen 27 and the inner surface of the cylindrical/conoidal bowl 25,26. The supply of slurry to be processed takes up the near cylindrical form (7A) with the drum rotating and applying a force many times that of gravity to the drum contents. Under these conditions the liquid in the conoidal section 26 flows through the perforations in the screen 27, through the space provided by the woven gauze 28 and, under the large applied centrifugal force, leaves the drum through the lower perforations 8 in the cylindrical section 25 of the bowl.

When the drum is then rotated slowly (typically 1–10 rpm), the centrifugal force applied to the drum contents by rotation becomes negligible. Following the vertical movement 12 of the plough 10, the solids have an upper surface that is nearly flat and parallel to the bottom 13 of the drum. This allows further liquid to be added to the solids through the pipe 6 for washing (known as reslurry washing), for crystal growth or for other process reactions in which benefit is derived from further solid/liquid contact. This process takes place with the drum either stationary or rotating slowly (typically 1–10 rpm) and may be assisted by immersing the plough mixing blades 20 heated or otherwise, into the mixture to give a stirring action, without loss of the added liquid through the perforations (dimension X placing the lowest perforation above the level of the reaction mixture). When the reslurry wash or other process is complete, acceleration of the drum, combined if necessary with an inflow of liquid, will cause the wet solids to flow to the near cylindrical shape (7A). An additional mechanical stage of drying for the extraction of the added liquid as described above, followed by evaporation, may then be applied and repeated as required. An additional washing system (known as plug flow washing) is also available by passing wash liquid through a wash pipe 56 having spray nozzles 29 when the drum is rotating rapidly during the first phase of extraction. For the preferred arrangement shown in FIG. 4, where the radial thickness of the solids varies, the spacing and/or size of the spray nozzles 29 is adjusted so that the solids in the conoidal section 26 receive a plug wash flow proportional to their radial thickness.

Figure 5:
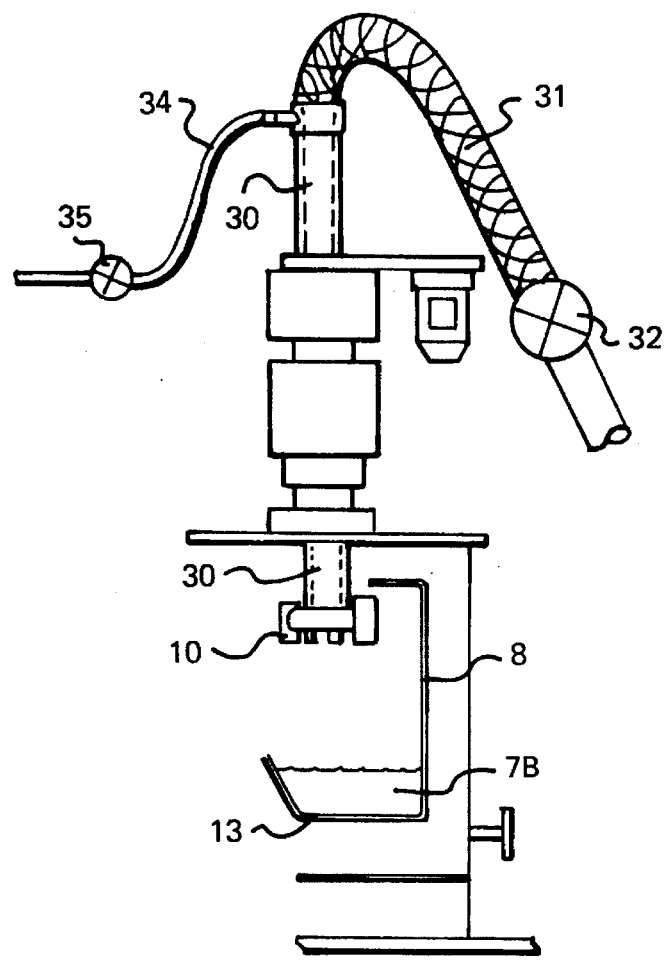
FIG. 5 shows a modified arrangement producing a simpler design.
Figure 6:
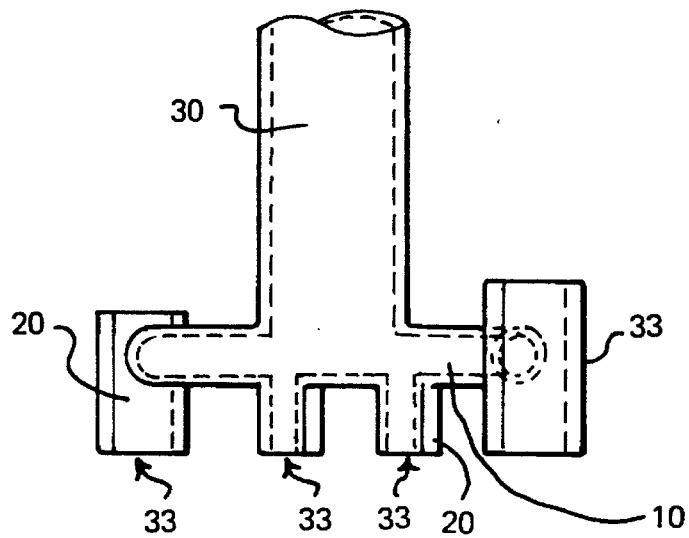
FIG. 6 shows a preferred form of paddle/plough.

In an alternative preferred arrangement shown in FIG. 5, the suction pipe 23, the plough 10 and plough mechanism 11 are combined into one assembly to produce a simpler design. A spindle 30 supporting the plough 10 and mixer blades 20 is hollow so as to act also as the suction pipe, the vertical movement during suction being provided by the plough operating mechanism 11. The upper end of the hollow spindle 30 is connected by a flexible hose 31, or equivalent, and a valve 32 to the suction fan or vacuum pump and solids removal system (not shown). The plough 10 and mixer blades 20 are also hollow, preferably constructed in hollow section materials as shown in FIG. 6, to provide a series of openings 33 in the plough and mixer blades. Upon completion of the second or last drying phase, the plough is traversed until the openings 33 are at or below the surface of the dried solids (7B), the valve 32 is opened and suction is applied to extract the solids as described above but through the openings 33. During suction, the drum is rotated slowly and the plough is oscillated and advanced towards the drum bottom plate 13 until all the solids have been removed.

During drying, this arrangement offers the additional advantage of delivering hot air or gas to assist in the second stage of drying. For this purpose, the hollow spindle 30 can be connected by a second flexible hose 34 and valve 35 to a source of hot air or gas as shown in FIG. 5. To assist the drying of solids (7B), valve 32 is closed, valve 35 is opened and hot air or gas is arranged to flow through the hollow spindle and the plough openings 33. The plough is positioned near or under the surface of the solids (7B) and is oscillated, whilst the drum 8 is rotated slowly to expose all solids to the flow of hot air or gas for rapid stage two drying.

Figure 7:
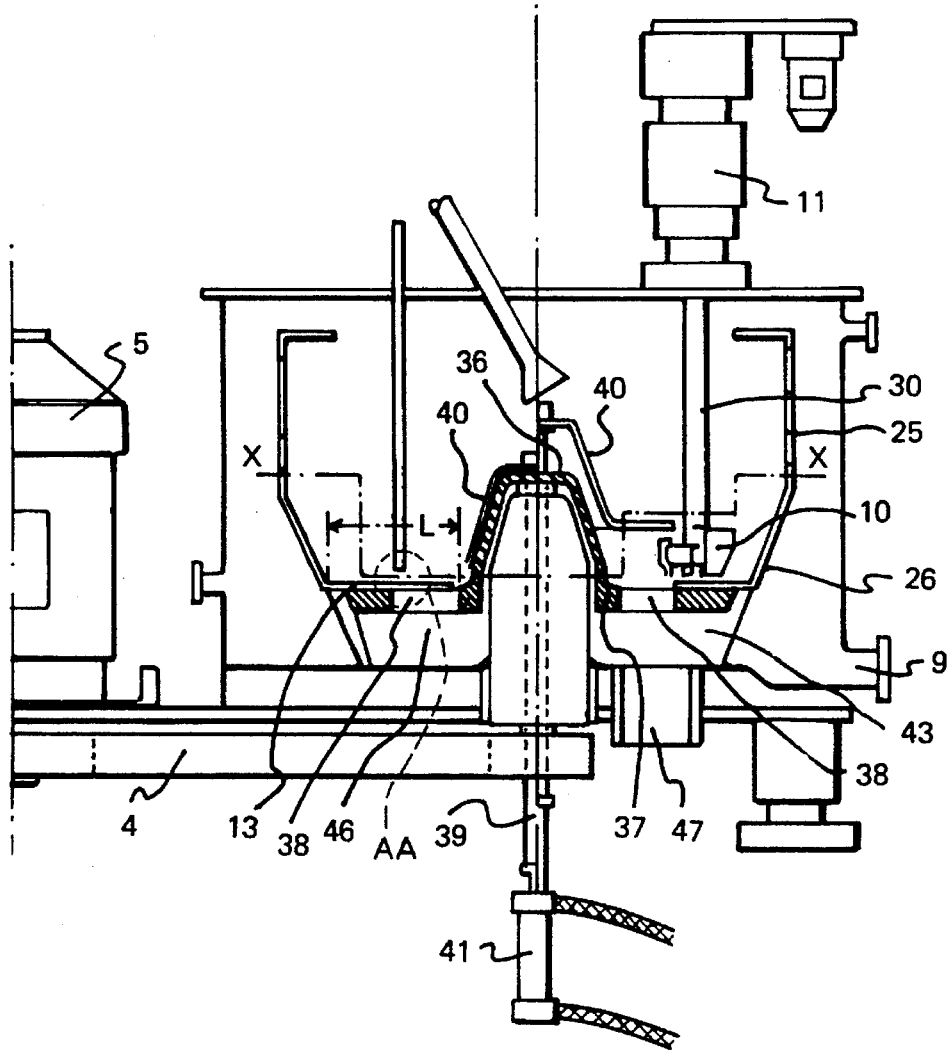
FIG. 7 illustrates a modified version of the apparatus of FIG. 1 adapted to use the arrangements of FIGS. 5 and 6 which is split to illustrate one condition on side A of the broken line and a second condition on side B of the broken line.
Figure 7A:
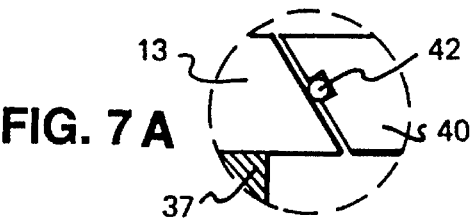
FIG. 7A is an enlarged sectional view in the area AA of FIG. 7.

An alternative means of discharging the dried solids that is preferred when processing bulk chemical products is shown in FIGS. 7A and 7B. In this arrangement, the drum bottom 13 is annular in shape and is connected to the drive spindle 36 by a drive plate 37, the drive plate 37 having one or more openings 38 cut there-in for the discharge of dried solids. The drive spindle 36 transmits the power of the drive motor 5 to rotate the drum, the spindle 36 being hollow and containing coaxially an actuating spindle 39. A conically shaped cover having a flange 40 is attached to the top of the actuating spindle 39, the actuating spindle being capable of being raised and lowered by one of a known means (such as pneumatic or hydraulic cylinder 41, mechanical screw and clutch, linear actuator, etc.). When the actuating spindle 39 is at or near its lowest position, as shown in FIG. 7A, the outer periphery of the flange 40 seats into the centre of the drum bottom 13 and is sealed there-to by a rubber ring 42, or a known equivalent, to completely cover and seal the opening(s) 38. On the other hand, when the actuating spindle 39 is at or near its highest position, as shown in FIG. 7B, the conical shaped cover having the flange 40 is raised to expose the opening(s) 38 and allow the discharge of dried solids in to the stationary space 43 below the drum.

First and second stage drying, reslurry washing, reaction and other process stages are all carried out with the opening(s) 38 sealed by the flange 40 as described above, the process stages using centrifugal force, heat, gas flow, vacuum and/or inert gas conditions as required. The dried and processed solids are then discharged by raising the flange 40 to expose the openings 38. For this configuration, a more complex plough-mixer blade assembly 10,20 is required to perform four functions:

A. discharge the centrifuged solids from the drum wall to the drum bottom 13 and flange 40;

B. oscillate over the radial length L in both directions, with the openings 38 sealed to sweep the drum bottom, comprising drum plate 13 and flange 40 for heat drying, mixing stirring, etc;

C. Oscillate over the radial length L with the opening(s) 38 exposed to discharge the dried solids; and D. move vertically to positions above the lowered flange 40 for functions A and B and below the raised flange 40 for function C.

Figure 8:
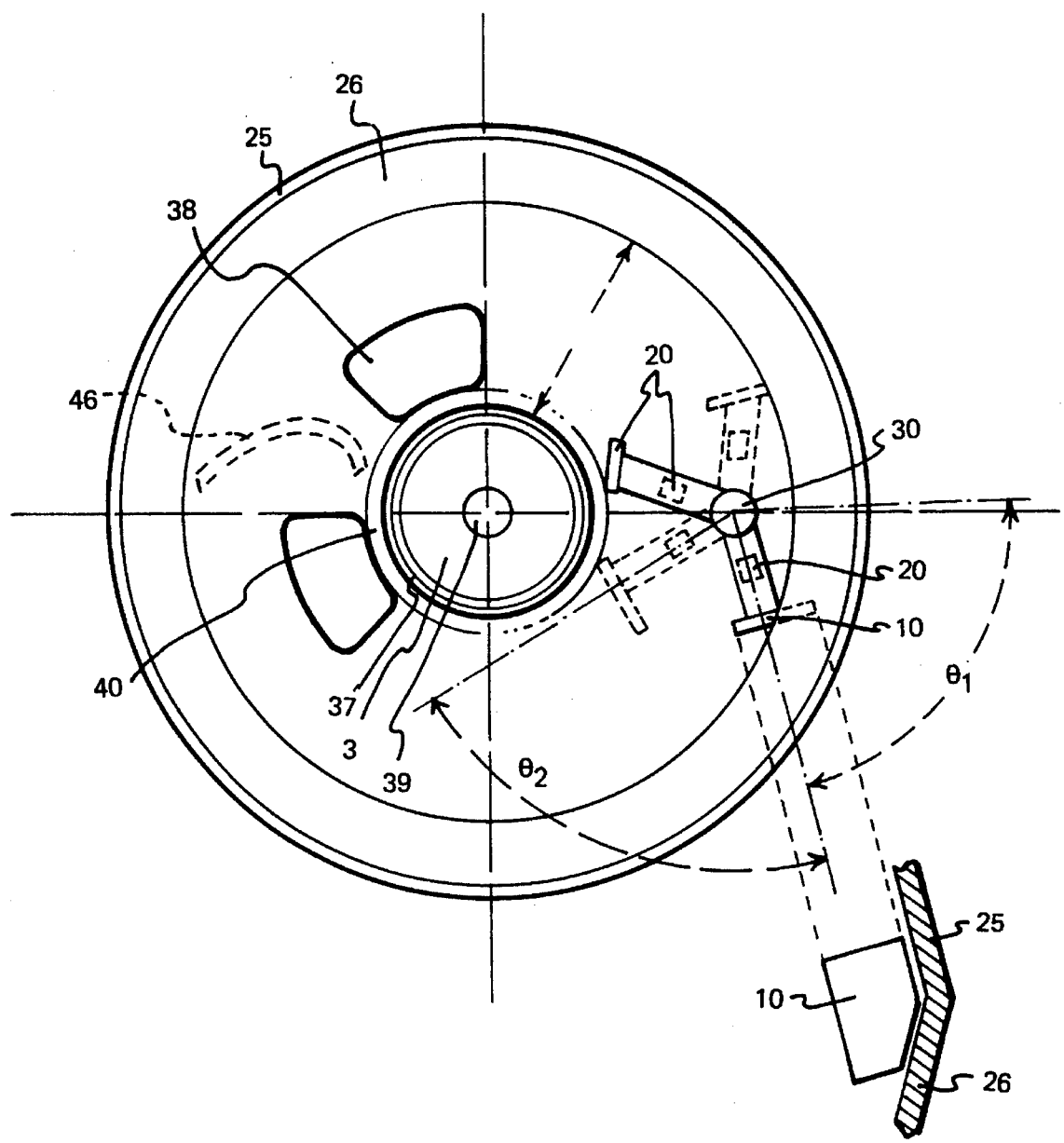
FIG. 8 is a diagrammatic plan view illustrating the structure and operation of a modified paddle/plough.

FIG. 8 shows, in plan view on section XX of FIG. 7 and to a larger scale, one arrangement of a plough/mixer blade assembly that meets the latter requirements, this being one of a variety of designs required for centri-dryers of varying dimensions. The plough-mixer blade assembly 10,20 is angled in plan and profiled to the angles of the drum 25 and conoidal section 26 sweeps over an arc $\Theta_1$ for function C to discharge the centrifuged solids from the drum and over an arc $\Theta_2$ for function B to sweep the drum bottom and flange. The angled shape of the plough-mixer blade assembly allows the plough to pass the outer edge of the flange 40 and take up a position below the flange. Suitable angular and transitional controls and interlocks in the plough operating mechanism 11 ensure the required movements of the plough-mixer blade assembly.

To complete the discharge of dried solids, any solids supported by the horizontal surface of the raised flange 40 are removed by intermittently raising the speed of the drum to dislodge them. As the solids pass through the openings 38 and into the stationary space 43, one or more blades 46 on the underside of the slowly rotating drive plate 37 displace and eject the solids through second openings 47 to a receiving vessel (not shown) for the processed solids.

In the apparatus shown in FIG. 7, the flange 40 is raised for the discharging of solids. In an alternative arrangement (not shown), the flange 40 can be positioned under the drum drive plate 37 so that the flange is lowered for discharging solids and raised to seal the drum.

With the preferred cylindrical/conoidal drum, the centrifugal dryer reduces uneconomic evaporative drying to a minimum and allows a variety of processes, including drying, washing, reslurry washing, reaction and crystal growth under a sealed vacuum, pressure and/or inert gas environment, encased in a single enclosure that remains unopened during all processes. Completing several processes in one enclosure provides the advantages that it:

(a) reduces both processing time and the expense of providing interconnecting equipment (pipes, pumps, etc) between the discrete pieces of equipment that would otherwise be necessary to complete the several processes;

(b) reduces the possibility of product contamination; and (c) reduces the environmental hazards of toxic chemicals and gases passing into the atmosphere.

We claim:

1. Apparatus for performing particle separation from a liquids/solids slurry comprising:

a partly perforated centrifuge drum for rotating about a vertical axis at a plurality of selected speeds, including a fast speed at which centrifugal effects on material in the drum are substantial so that partly dried solids collect in a substantially cylindrical mass on a side wall of the drum, and a slow speed at which the centrifugal effects on material in the drum are negligible;

a stripping mechanism which includes an angularly displaceable plough device;

drive means for displacing said stripping mechanism within the drum when the drum is rotated at said slow speed for dislodging solids which have been built up on the side wall of the drum in said substantially cylindrical form during rotation at said high speed, and said drive means for angularly displacing said plough device within the drum about an axis parallel to said vertical rotational axis of the drum for entering solids which have been built up in said cylindrical form and also for displacing longitudinally of its own rotational axis for advancing along the length of said cylindrical mass of solids;

means for supplying a washing liquid to the interior of the drum to enable separated solids to be washed;

means for heating at least a bottom part of the drum on which partly dried solids collect when dislodged by said stripping mechanism from the side wall of the drum, whereby said solids are themselves heated to cause evaporation therefrom of any remaining liquid; and a plurality of mixing elements carried by said stripping mechanism which, when the plough device has been displaced longitudinally to approximately its fullest extent, are for entering said solids, which have collected on the drum bottom as a result of stripping by said plough device, and for stirring said solids so as to provide a substantial stirring action to maximize exposure of the surface area of the solids to the wash liquid when washing the solids and to the heated parts of the drum when drying the solids.

2. Apparatus according to claim 1, wherein said plough device is also displaceable laterally by said transmission means to enable its depth of insertion into said solids to be controlled.

3. Apparatus according to claim 1, wherein the heating means is adapted to heat the bottom part of the drum using at least one of a hot liquid, hot gas, steam, electrical heating wires and electrically induced eddy currents.

4. Apparatus according to claim 3 wherein the heating means is also adapted to heat at least one selected from a group of said plough device and said mixing elements.

5. Apparatus according to claim 3, wherein said heating means is also adapted to supply hot gas to the solids via at least one selected from said plough device and said mixing elements.

6. Apparatus according to claim 1, wherein the lower end of the drum is of conoidal shape, this lower part of the drum being free of perforations.

7. Apparatus according to claim 1, wherein a bottom part of the drum includes a selectably displaceable cover which can be moved between a first position, in which it covers at least one discharge hole in the drum, and a second position in which it opens said at least one discharge hole to enable solids to be discharged therethrough.

8. Apparatus according to claim 1, wherein said plough device comprises an elongate support bar on which said plurality of mixing elements are located at an angle to the longitudinal axis of said elongate support bar.

9. Apparatus for performing particle separation from a liquids/solids slurry comprising:

a partly perforated centrifuge drum for rotating about a vertical axis at a plurality of selected speeds, including a fast speed at which centrifugal effects on material in the drum are substantial so that partly dried solids collect in a substantially cylindrical mass on a side wall of the drum and a slow speed at which the centrifugal effects on material in the drum are negligible;

a stripping mechanism which includes a plough device having a plurality of angularly displaceable plough blades;

drive means for displacing said stripping mechanism within the drum when the drum is rotated at said slow speed for dislodging solids which have been built up on the side wall of the drum in said substantially cylindrical form during rotation at said high speed, and said drive means for angularly displacing said plough device within the drum about an axis parallel to said vertical rotational axis of the drum for entering solids which have been built up in said cylindrical form and also for displacing longitudinally of its own rotational axis and for advancing along the length of said cylindrical mass of solids;

a plurality of mixing elements carried by said stripping mechanism which, when the plough device has been displaced longitudinally to approximately its fullest extent, will enter said solids, which have collected at a bottom part of the drum as a result of stripping by said plough device, for providing a substantial stirring action by angular displacement within said solids; and passage means within at least one of said plough device and said mixing elements enabling the passage of hot gas through the stripping mechanism to said solids which collect in said drum bottom when dislodged by said stripping mechanism from said side wall of the drum, whereby said solids are themselves heated to cause evaporation therefrom of any remaining liquid.

* * * * *